United States Patent
Tokuda et al.

(10) Patent No.: US 7,124,073 B2
(45) Date of Patent: Oct. 17, 2006

(54) COMPUTER-ASSISTED MEMORY TRANSLATION SCHEME BASED ON TEMPLATE AUTOMATON AND LATENT SEMANTIC INDEX PRINCIPLE

(75) Inventors: Naoyuki Tokuda, Tokyo (JP); Liang Chen, British Columbia (CA); Hiroyuki Sasai, Tokyo (JP)

(73) Assignee: SunFlare Co., Ltd, Tokyo (JP)

( * ) Notice: Subject to any disclaimer, the term of this patent is extended or adjusted under 35 U.S.C. 154(b) by 774 days.

(21) Appl. No.: 10/072,953

(22) Filed: Feb. 12, 2002

(65) Prior Publication Data
US 2003/0154068 A1    Aug. 14, 2003

(51) Int. Cl.
*G06F 17/28* (2006.01)

(52) U.S. Cl. .............................. 704/2; 704/9
(58) Field of Classification Search .................. 704/2, 704/7, 9
See application file for complete search history.

(56) References Cited

U.S. PATENT DOCUMENTS

| | | | |
|---|---|---|---|
| 4,839,853 A | 6/1989 | Deerwester et al. | |
| 5,301,109 A | 4/1994 | Landauer et al. | |
| 5,675,819 A | 10/1997 | Schuetze | |
| 5,724,593 A | 3/1998 | Hargrave, III et al. | |
| 6,006,221 A | 12/1999 | Liddy et al. | |
| 6,131,082 A | 10/2000 | Hargrave, III et al. | |
| 6,523,026 B1 * | 2/2003 | Gillis | 707/3 |
| 6,535,842 B1 * | 3/2003 | Roche et al. | 704/7 |
| 6,654,740 B1 * | 11/2003 | Tokuda et al. | 707/5 |
| 6,760,695 B1 * | 7/2004 | Kuno et al. | 704/9 |
| 6,847,966 B1 * | 1/2005 | Sommer et al. | 707/5 |

FOREIGN PATENT DOCUMENTS

JP    2887660    2/1999

OTHER PUBLICATIONS

Press, William H., et al., "Numerical Recipes in C: The Art of Scientific Computing", $2^{nd}$ ed., (Cambridge University Press: 1992), pp. 59-70, 965-994.

* cited by examiner

*Primary Examiner*—Tālivaldis Ivars Smits
*Assistant Examiner*—Eunice Ng
(74) *Attorney, Agent, or Firm*—Jacobson Holman PLLC

(57) ABSTRACT

A new, more efficient memory translation algorithm facilitating the acquisition of a most appropriate translation in a target language from among those of nearly narrowed-down candidates of translation by separately applying the so-called dimension reducing functions of a template automaton and the LSI (latent semantic index) technique. Both the template automaton and the LSI principle play an important role in implementing an efficient process of narrowing down an efficient solution space from among the many example sentences of the databases in a target language by exploiting their respective unique search space reduction function. Once developed into a fully operational system, an expert editor rather than an expert translator can tune up the translation memory system, markedly widening the range of available experts who can utilize the system.

7 Claims, 2 Drawing Sheets

COMPUTER-ASSISTED MEMORY TRANSLATION SCHEME BASED ON TEMPLATE AUTOMATON AND LATENT SEMANTIC INDEX PRINCIPLE

BACKGROUND OF THE INVENTION

1. Field of the Invention

This invention relates to the field of translation memory and, more particularly, to a new computer-aided translation system suitable for technical materials now widely used in the localization of computer software.

2. Description of the Related Art

The idea of translation memory is basically very simple. Translation memory serves to increase the efficiency of the translation process of technical documents, saving considerable time by prompting the answer to the question: "How did I translate this or a similar sentence last time?" A translation memory provides a powerful tool for automatic translation of sentences that have been previously translated by experts and stored within the translation memory database, with minor differences in an original segment being accounted for by suggesting a translation of a similar segment found in the databases. The translation memory should preserve the format of the original document, restoring such format once the translation is complete.

Automatic translation of sentences that have been stored in a database is certainly very easy, provided that the syntactical sentence structure as well as the entire word usage including word order used in both documents are consistent and identical throughout the documents. Unfortunately, any natural language used in practice is context-sensitive and is sharply distinguished from the artificial languages such as programming languages in that extensive use of ambiguous expressions is allowed, including synonymies and polysemies and ambiguous syntactical structures, for example. Therefore, a most difficult and challenging task required of translations based on a translation memory scheme is the matching of sentences which have a similar, or exactly the same, meaning but which are expressed using different words or in terms of differing structural expressions. This difficulty may be resolved with the help of the latent semantic index (LSI) matching principle.

To allow processing of flexible, context-sensitive natural languages, which are characterized by ambiguities, a template automaton structure has been designed as set forth in Japanese Patent No. 2887660, exploiting the FSA (finite state automaton)-based ATN transitional rules. This template automation structure allows for multiple expressions of ambiguous words and ambiguous syntactic structures while retaining the clarity in diverse meanings of the sentences, where each of the paths in the template constitutes a complete and meaningful context-sensitive sentence. The template structure is capable of storing and representing sentences using different expressions or structures denoting equivalent meanings provided the language is restricted to one of the natural languages.

SUMMARY OF THE INVENTION

The present invention is directed to a translation system between two languages, although cross-language translation to effect the translation of one-to-many or many-to-many languages is also contemplated. The database of this invention stores sets of items or sentences namely comprising word(s) or phrase(s) in respective languages where, when successfully connected and identified, each of the paths in the set of the templates have equivalent meanings but belong to a different set of languages.

The present invention makes full use of the latent semantic structure in the construction of the template database. When treated as a document in LSI space, each template can be represented by a document vector and can be projected info latent semantic space. Thus, for each natural language involved, the latent semantic structure with reduced singular value decomposition technique such as that of U.S. Pat. No. 4,839,853, may be applied to set up an effective retrieval system of semantically closely related sentences by matching a sentence "s" in language X to a class of templates in the same language having a closest similarity to "s" in the latent semantic space.

To ensure a wide applicability of the translation system so that the system is practical, the items stored within the database should be sufficiently extensive and complete enough to include an adequate number of template databases.

A premise of the present invention is that, when restricted to one language, the set of documents that are close to a certain document as measured by the heaviest common subsequence should be a subset of the documents that are close to the certain document in the latent semantic space. This is so partly because the latent semantic analysis grasps the important semantic similarity based on the meaning of the terms (words) used in the sentences, and partly because two sentences characterized by identical semantics should contain a certain number of words in common while the latent semantic index matching method should be able to match the sentences with a reasonable number of synonyms.

Thus, once the system of the present invention has been set up for a sentence "s" to be translated from source language X to target language Y, a set of templates in language X is selected in accordance with the latent semantic criteria such that the items having N highest scores of the criteria for sentence "s" are selected. Then, among these templates, M (M<N) items having a highest score of the heaviest common sequence to "s" are selected. Note that, once all the templates have been stored as items in the database, together with their translations, it is possible to find a set of items in the templates in language X having the highest score to sentence "s" from both the LSI matching criteria and the heaviest common sequence criteria. The latter criteria should always have a priority because the exact match by the latter criteria necessarily implies a successful search of a translated sentence as in translation memory.

Once the sentence to be translated is matched to items which have a close similarity, an expert translator can select the one which is closest to the sentence. A visual template authoring tool (VTAT) is then used to edit the templates in both languages to improve and maintain the database.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

According to the present invention, first a translation memory system is set up, and then the translation process based on the translation memory system is undertaken.

Figure 1:
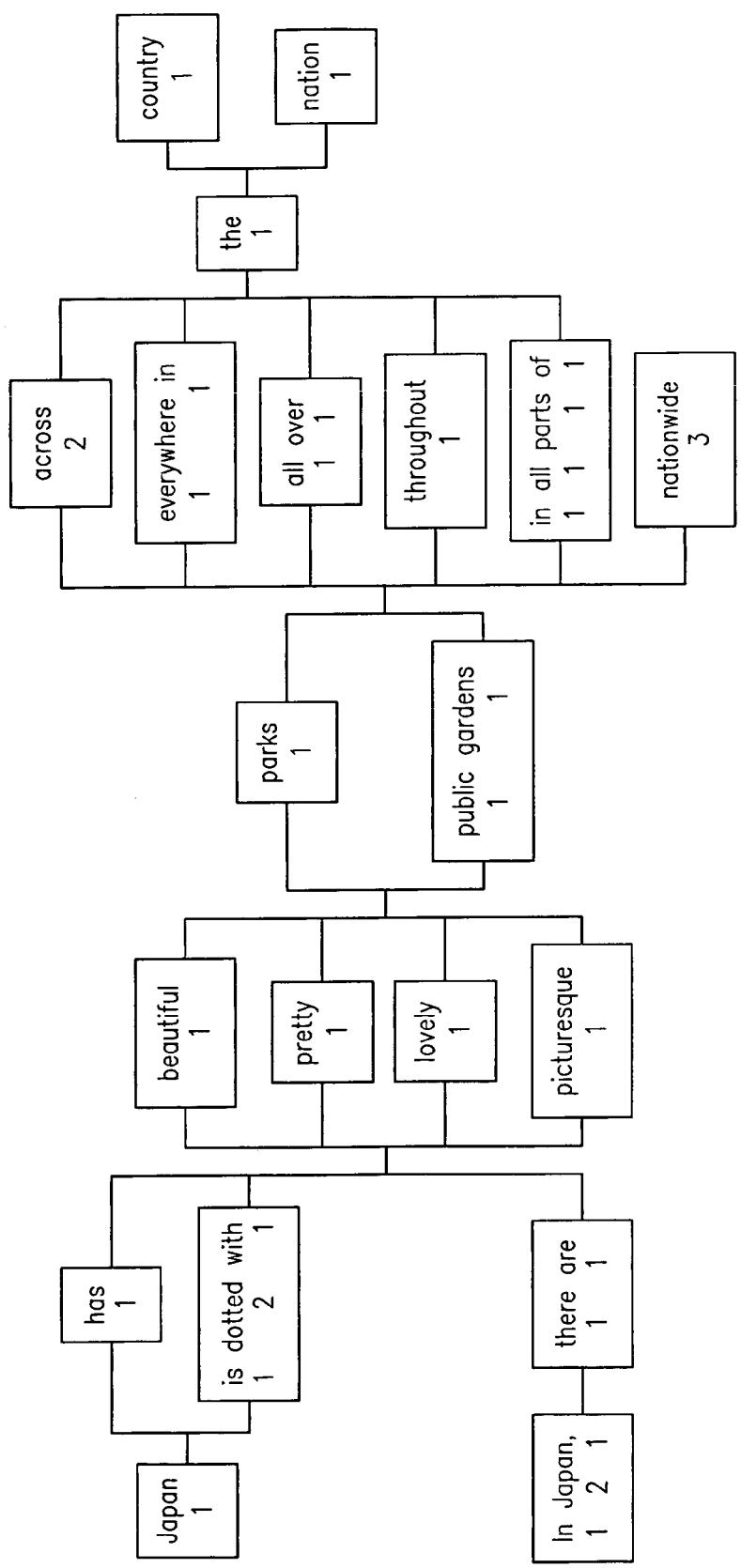
FIG. 1 illustrates a template for an English sentence meaning "Japan is dotted with beautiful parks nationwide"

The process of setting up the translation memory system of the present invention is typically done only once at the outset when sentences of different languages with similar meanings are collected into a database. In this case, each template is just a simple sentence. FIG. 1 shows a typical template for an English translation of a Japanese sentence meaning, "Japan is dotted with beautiful parks nationwide." The numbers under each of the words denote weights assigned to the word representing its relative importance.

The setting-up process may be executed once when an adequate number of translated templates have been collected, namely when a substantially large number of templates in the database have been modified and updated after the system has been in use for a certain extended number of days. The database may then be updated and modified from time to time in the process of "online translation".

Figure 2:
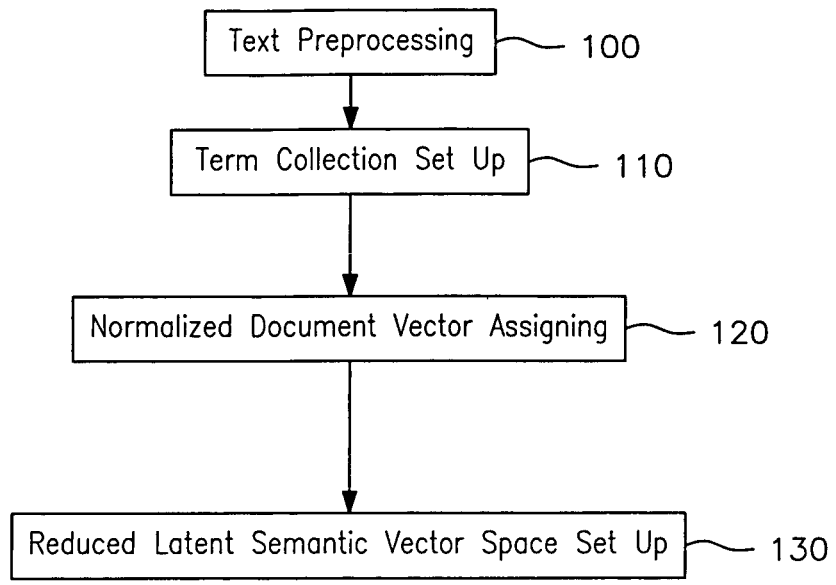
FIG. 2 is a flow diagram describing the process needed to set up the template system where paths in templates constitute the reduced LSI document space.

As shown in FIG. 2, the setting up process begins with text preprocessing, step 100, followed by system term construction, step 110. During system term construction, step 110, a term list is set up and global weights of the terms are chosen. The global weights are set to "1" by default or may be set up according to a formula which will be discussed hereinafter.

The process of the present invention continues with assigning normalized latent semantic vectors of all the collected templates, step 120, and then a reduced latent semantic vector space is set up, step 130. The reduced latent semantic vector space may be set up by exploiting the singular value decomposition (SVD) algorithm, also known as the singular vector decomposition algorithm. The SVD algorithm is known to persons of skill in the art (see *Numerical Recipes in C: The Art of Scientific Computing*, William H. Press, et al., Cambridge University Press).

Figure 3:
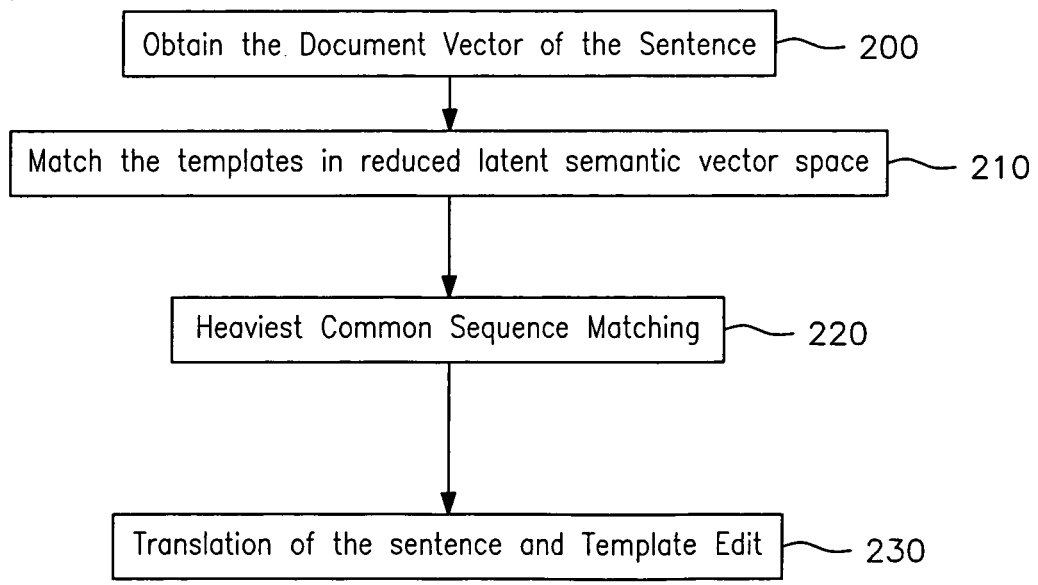
FIG. 3 is a flow diagram depicting the flow of system execution in translating a sentence by way of translation memory.

The translation process based on the translation memory system is summarized in FIG. 3. A sentence "s" in source language X is treated as a simple document; a term by document vector is set up by generating the terms as well as their frequency of occurrence, and thus a normalized latent semantic vector is obtained for the sentence, step 200.

The items having closest similarities to "s" are then identified from among the templates in language X based on the similarity measurement of the reduced latent semantic vector space, step 210. The method continues by finding, step 220, the heaviest weighted common sequence of "t" and "s" as well as the total weight of the path that includes the heaviest weighted common sequence for each template "t" in language X as selected in step 210. Those templates whose heaviest weighted common sequence to the sentence includes the largest proportion of sentence "s" are chosen, and listed in a decreasing order of sequence in accordance with the similarity measurement of the sentence and the templates, step 220.

Finally, translation of the sentence and template editing is undertaken, step 230. In step 230, one proper item is manually selected and any syntactically valid path "p" in the template of target language Y is chosen. Based on template "t" and sentence "s", a new template structure $t_x$ in language X is first obtained by registering sentence "s" into the template structure "t" by combining each pair of the matched terms into the proper template node. If the path "p" chosen is a correct translation of "s", then template $t_x$ is edited so that each path of the template $t_x$ represents a correct sentence having the same meaning of "s", replacing the template "t" in the database with the new template $t_x$ just obtained. The weights of some words appearing in the template $t_x$ may be adjusted if necessary. If the path "p" chosen is not a correct translation of "s", then editing is undertaken and a new template $t_y$ in language Y is obtained so that each path of $t_y$ is a translation of "s". The template $t_x$ is edited so that each of the paths in the template represents a correct sentence having the same meaning of "s". Then the two templates are added and inserted as a new item in the database. The weights of some words appearing in the templates $t_x$ and $t_y$ may be adjusted if necessary.

Further detail on the operation of the present invention will be set forth under the headings "Template and Latent Semantic Vector" followed by "LSI Matching and Template Matching".

A. Template and Latent Semantic Vector

As used herein, a template refers to a part of an augmented transition network (ATN) with at least one starting node and at least one terminating node, where every node consists of a word(s) or a phrase(s), with each word being assigned a non-negative real number as its weight representing the relative importance of the word within the sentence. The default weight of each word in the template is "1". A 'syntactically valid' sentence is constructed by linking the nodes starting from the starting node of the sentence to the final or terminating node. While often a template can be very simple, comprising a normal sentence, they can also be quite complex so that the template need not necessarily be totally connected, but may comprise several disconnected parts.

To begin, the terms are defined as words or phrases that appear in at least two different templates. So-called stop words, which are most frequently used in any unrelated topic, such as "a" and "the" in English, are excluded. Weights are assigned to all the words in the template.

Suppose we select and list the terms that appear in the documents as $(t_1, t_2, \ldots, t_m)$. Each of the well-formed or valid templates expressed in a natural language can be preprocessed, assigning the proper document vector. For example, the document vector may be set as $(\alpha_1, \alpha_2, \ldots, \alpha_m)$, where $\alpha_i = f_i \times g_i$, where $f_i$ is the number of times the term $t_i$ appears in the template, and $g_i$ is a global weight of the term $t_i$ for the template, which is a parameter indicating the importance of the term in representing the documents. Local weights may be either raw occurrence counts, or boolean, or logarithmic representations of occurrence counts. Global weights can be assigned by a uniform weighting, domain specific weighting, or entropy weighting. For example, $$f_1 = \log(1 + O_i) \text{ and } g_i = 1 - \frac{1}{\log N} \sum_{j=1}^{N} p_{ij} \log(p_{ij}),$$

where $$p_{ij} = \frac{O_{ij}}{d_i}.$$

Here, $O_i$ denotes the number of times that a term $t_i$ appears in the template, $d_i$ is the total number of times that the term $t_i$ appears in the collection, $O_{ij}$ is the number of times that the term $t_i$ appears in the template j, while N is the number of documents in the collection. Notice that, $p_{ij} \log(p_{ij})$ is defined to be 0, if $p_{ij}=0$.

The document vector is normalized as $(b_1, b_2, \ldots, b_m)$ by the following formula:

$$b_i = a_i \bigg/ \sqrt{\sum_{j=1}^{m} a_j^2}.$$

B. LSI Matching and Template Matching

Document Vector of Terms and LSI Matching

Once an adequate number of items has been stored in the template database, each template is regarded as a document consisting of words and phrases. Under such situations, both the LSI matching scheme and the D-LSI (differential LSI) matching scheme can be used to search the database to find templates that are similar to a sentence to be translated.

The LSI matching scheme may be used as follows.

For each language X involved, a matrix $M_X$ is set up using the templates given in language X, where each column represents the normalized document vector of the template.

By employing the singular value decomposition (SVD) method, $M_X$ may be decomposed as $M_X = U_X \Sigma_X V_X^T$, where $U_X$ and $V_X$ have unit-length orthogonal columns and $\Sigma_X$ is a diagonal matrix. By choosing the k largest singular values of $\Sigma_X$ and the associated columns of $U_X$ and $V_X$, $M_X$ may be approximated as $M_{X_k} = U_{X_k} \Sigma_{X_k} V_{X_k}^T$. The appropriate value of k must be chosen depending on the application. Generally k may be chosen approximately at 2%–5% of the number of templates within the collection.

For each template "t" in language X, the corresponding normalized document vector $v_t$ may be projected onto the vector space spanned by the columns of $U_{X_k}$ whose projection is given by $U_{X_k}^T v_t$.

To translate a sentence "s" of a language X, it is necessary to assign a normalized document vector $v_s$ and search the items in the database by seeking the normalized document vectors of the templates having "closest similarity" to $v_s$ as measured by the angles of their projections onto the vector space spanned by the columns of $U_{X_k}$.

Template Matching

Within the items as selected by the latent semantic measurement, a subset is then selected by computing the weight of the heaviest common subsequence. A common sequence of a template and a sentence to be translated is defined as a sequence of words which is common to both the sentence and a path embedded within the template.

Suppose that $c_1 c_2 \ldots c_n$ is a common sequence of a template and a sentence, with the weights of the word $c_i$ in the corresponding template and sentence being given by $w_{1,i}$ and $w_{2,i}$ respectively. Then the weight of the common sequence is defined as:

$$W = \sum_{i=1}^{n} w_{1,i} w_{2,i}.$$

If the total weights of the words in the path which include the common sequence $c_1 c_2 \ldots c_n$ and the sentence are given by $W_1$ and $W_2$ respectively, the similarity of the sentence and the template is defined as $$Sim = \frac{W^2}{W_1 W_2}.$$

The heaviest common sequence matching algorithm can be described as follows. Given a template and a sentence, it is necessary to find a common sequence as well as the corresponding path of the template, such that the weight of the common sequence of the path and the sentence has a heaviest weight.

The weights of the words in the sentence and template are set to "1" by default; these weights must be assigned in accordance with the importance of the words as judged by experts in the field.

If the sentence to be translated constitutes a simple template, a template matching algorithm may be applied to find the heaviest common sequence of a template and a sentence.

Following the processing relating to latent semantic measurement and heaviest common sequence, a closest item in similarity is chosen by an expert(s) of translation which involves essentially the following maintenance task of the databases.

After a template "t" in language X as well as the corresponding template in language Y is chosen as a translation of a sentence "s", a new template containing sentence "s" as a valid path can be obtained by registering the sentence "s" into the template structure "t" by embedding each pair of matched terms into one node.

A template editor such as VTAT (Visual Template Authoring Tool) may be exploited to implement the following maintenance tasks of the template databases.

To begin, any one path from the template in a target language (say, Y) is chosen. If the path is a proper translation of source sentence "s", the new template obtained from "t" and "s" is checked and edited so that each path is a correct sentence sharing the same meaning; template "t" is then replaced with the new template. If the path is not a proper translation of the source sentence "s", the template in language Y and template in language X are edited into template $t_y$ and $t_x$ respectively, such that any syntactically valid path of template $t_y$ is a correct translation of "s", $t_x$ includes "s" as a valid path, and any path of $t_x$ is a correct sentence in the source language X. A new item consisting of $t_x$ and $t_y$ is then added to the database.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A method of setting up and using a computer-assisted memory translation scheme for translating a sentence between a source language and a target language comprising the steps of:

setting up a translation memory system with a plurality of templates using reduced latent semantic vector space; and performing a translation process using said translation memory system and a determination of common subsequences between the sentence and the plurality of templates, said step of performing the translation process including, finding a subset of templates having closest similarity to the sentence based on a similarity measurement of the reduced latent semantic vector space;

selecting, from said subset, a set of items having a heaviest weighted common subsequence between said sentence and said subset of templates; and selecting, from the set of items, a template closest to said sentence as a sentence translation, said step of selecting a template further including, choosing a syntactically valid path in a target language template;

registering the sentence into source language template, t, by combining each pair of matched terms into a proper template node to obtain a new source language template structure $t_x$;

if the path chosen is a correct translation of the sentence, editing template $t_x$ so that each path of template $t_x$ represents a correct sentence having a same meaning as the sentence, and replacing the template t in the database with the new template $t_x$; and if the path chosen is not a correct translation of the sentence, obtaining a new target language template structure $t_y$ so that each path of $t_y$ is a correct translation of the sentence, editing $t_x$ so that each path of $t_x$ represents a correct sentence having a same meaning as the sentence, and adding together $t_y$ and $t_x$ and inserting the sum as a new item in the database.

2. The method as set forth in claim 1, wherein said step of setting up a translation memory system includes the steps of:

preprocessing text to identify word and noun phrases, and assigning weights to the words within each template;

constructing system terms by setting up a term list and choosing global weights for the terms on the term list;

assigning normalized latent semantic vectors of the templates; and setting up a reduced latent semantic vector space.

3. The method as set forth in claim 1, further comprising the step of editing the templates in both the source and target languages to reflect the sentence translation and improve the database.

4. The method as set forth in claim 1, further comprising the step of determining a total weight of that portion of the template including the heaviest weighted common subsequence.

5. The method as set forth in claim 2, wherein said global weights are set to "1" by default.

6. The method as set forth in claim 2, wherein said global weights are set up using one of uniform weighting, domain specific weighting and entropy weighting.

7. The method as set forth in claim 2, wherein the step of setting up a reduced latent semantic vector space is performed using a singular value decomposition algorithm.

* * * * *